(No Model.)

G. A. GAGE.
INSULATING ELECTRICAL WIRES.

No. 265,594. Patented Oct. 10, 1882.

WITNESSES—
F. B. Townsend
Chas. E. Gaylord.

INVENTOR—
Geo. A. Gage.

UNITED STATES PATENT OFFICE.

GEORGE A. GAGE, OF CHICAGO, ILLINOIS.

INSULATING ELECTRICAL WIRES.

SPECIFICATION forming part of Letters Patent No. 265,594, dated October 10, 1882.

Application filed December 5, 1881. (No model.)

*To all whom it may concern:*

Be it known that I, GEO. A. GAGE, of Chicago, in the county of Cook and State of Illinois, have invented certain new and useful Improvements in Insulating Underground Electrical Wires, of which the following is a specification.

The nature of my invention consists in laying electrical wires in a non-conducting material under ground, as more fully set forth in the annexed specification and drawings, in which—

Figure 1:
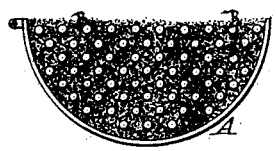
Figure 2:
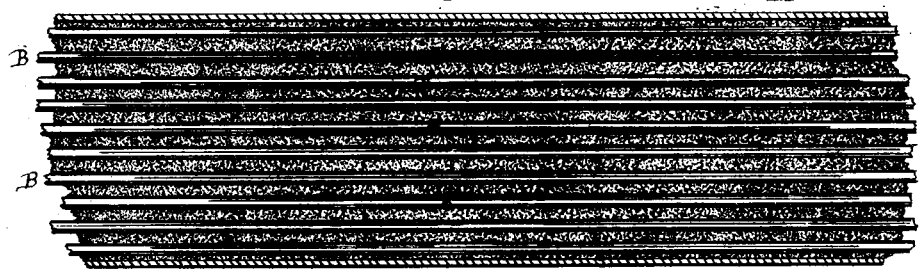

Figure 1 is a cross-section of box or pipe A, showing end of wires B, spaces between wires being filled with my insulating material. Fig. 2 is a longitudinal section of box or pipe A for holding wires B and insulating material.

In any suitable box or pipe, A, of any desirable shape or material, I first lay a row of wires longitudinal with the sides of box or pipe A and across the box or pipe A, as shown in Fig. 1. I then run on the wires silicate of soda, or silicate of soda and ground glass, of sufficient depth to entirely cover the wires. After allowing it to harden, I again place a row of wires on top of the insulating material and again fill, as before, with the insulating material, continuing this operation until all the wires are laid. This makes a solid non-conducting concrete with the wires incased.

If desired, for the purpose of more easy repairing, a thin piece of wood or other suitable material can be laid in between the several layers of wires, so as to keep the layers of wires separate, being careful to have sufficient of the insulating material between the wires and the piece so put in that the wires cannot come in contact with it. Wires laid in this manner are entirely protected from dampness and cannot rust, corrode, or wear out, as is the case when exposed to the weather.

If desired, the wires can first be wound with a covering of cotton or other suitable material to allow for expansion or contraction.

The shape and material of the box or receptacle to hold the wires is immaterial, as they can be put in a pipe or tube and the insulating material can be put in after all the wires are in; or the wires can be covered with the insulating material before being put into the receptacle.

I am aware that underground telegraph-wires have been laid in a trough which is afterward filled with an insulating compound of powdered silica, resin or pitch, and linseed-oil. I am also aware that a wire has been wrapped, braided, and otherwise covered with asbestos, and then the asbestus coated with silicate of soda; but such modes of insulating wires are not claimed by me.

Having thus described my invention, what I desire to secure by Letters Patent is—

1. The method herein described of laying and insulating underground telegraph-wires, which consists in placing a row of wires longitudinally in a receptacle, covering such wires with silicate of soda in a fluid state, permitting the latter to harden, then arranging another row of wires on the hardened insulating material, and covering the same with silicate of soda, all substantially in the manner set forth.

2. An electrical conducting-wire covered with silicate of soda, which is in direct contact with the surface of the wire, as and for the purpose described.

GEO. A. GAGE.

In presence of—
CHARLES A. FOLSOM,
ELAM L. KNOTT.